April 15, 1969

J. RECH 3,438,411

SET SCREW FEEDING AND HANDLING APPARATUS

Filed Dec. 13, 1966

INVENTOR.
JAKOB RECH.
BY
Wallace P. Lamb
ATTORNEY.

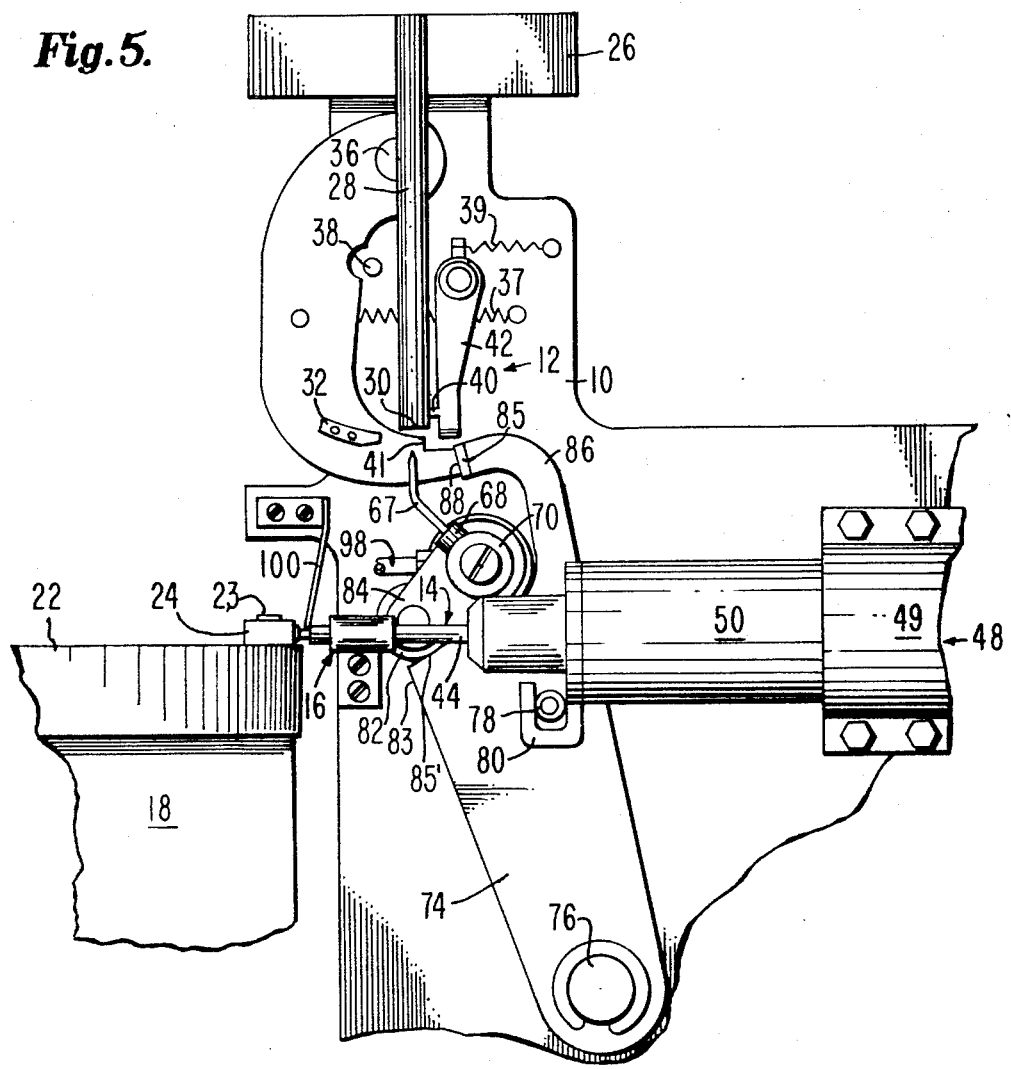
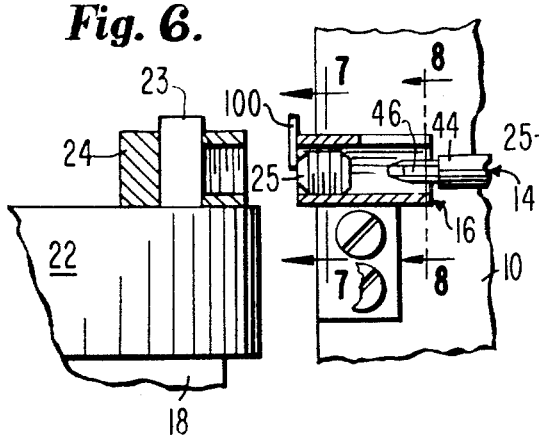
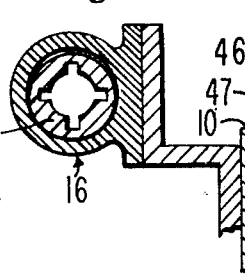
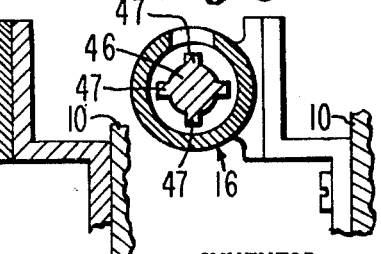

April 15, 1969  J. RECH  3,438,411
SET SCREW FEEDING AND HANDLING APPARATUS
Filed Dec. 13, 1966
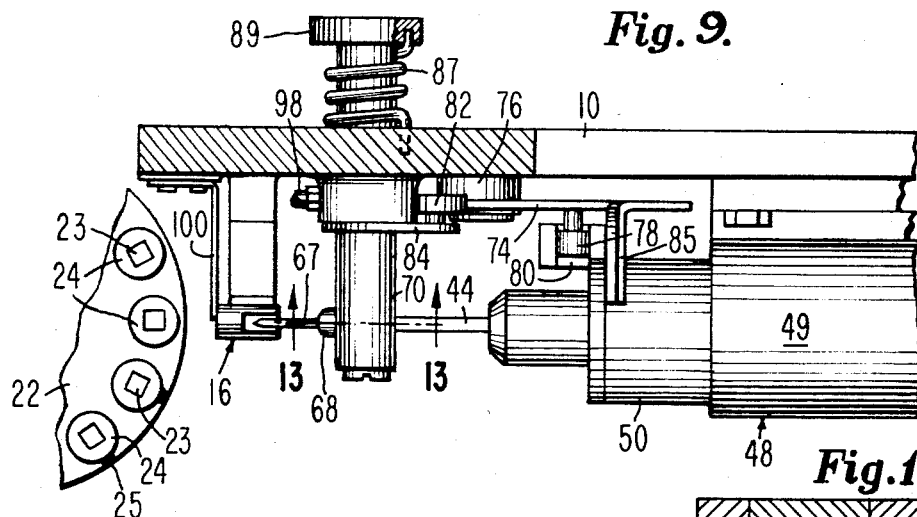
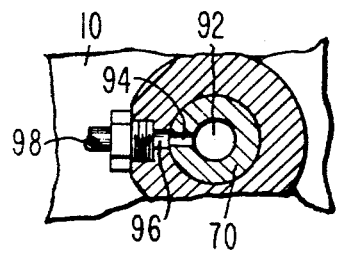
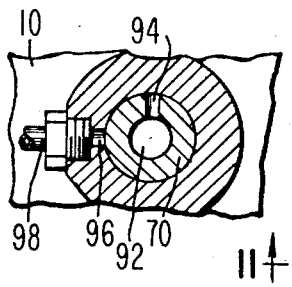
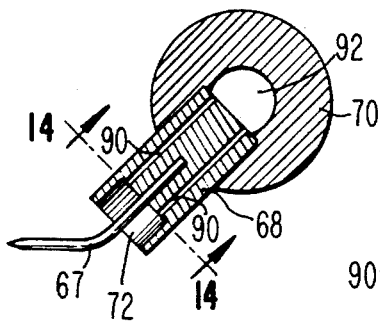
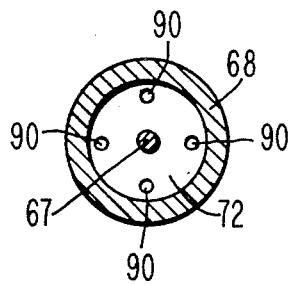
INVENTOR.
JAKOB RECH.
BY
*Wallace P. Lamb*
ATTORNEY.

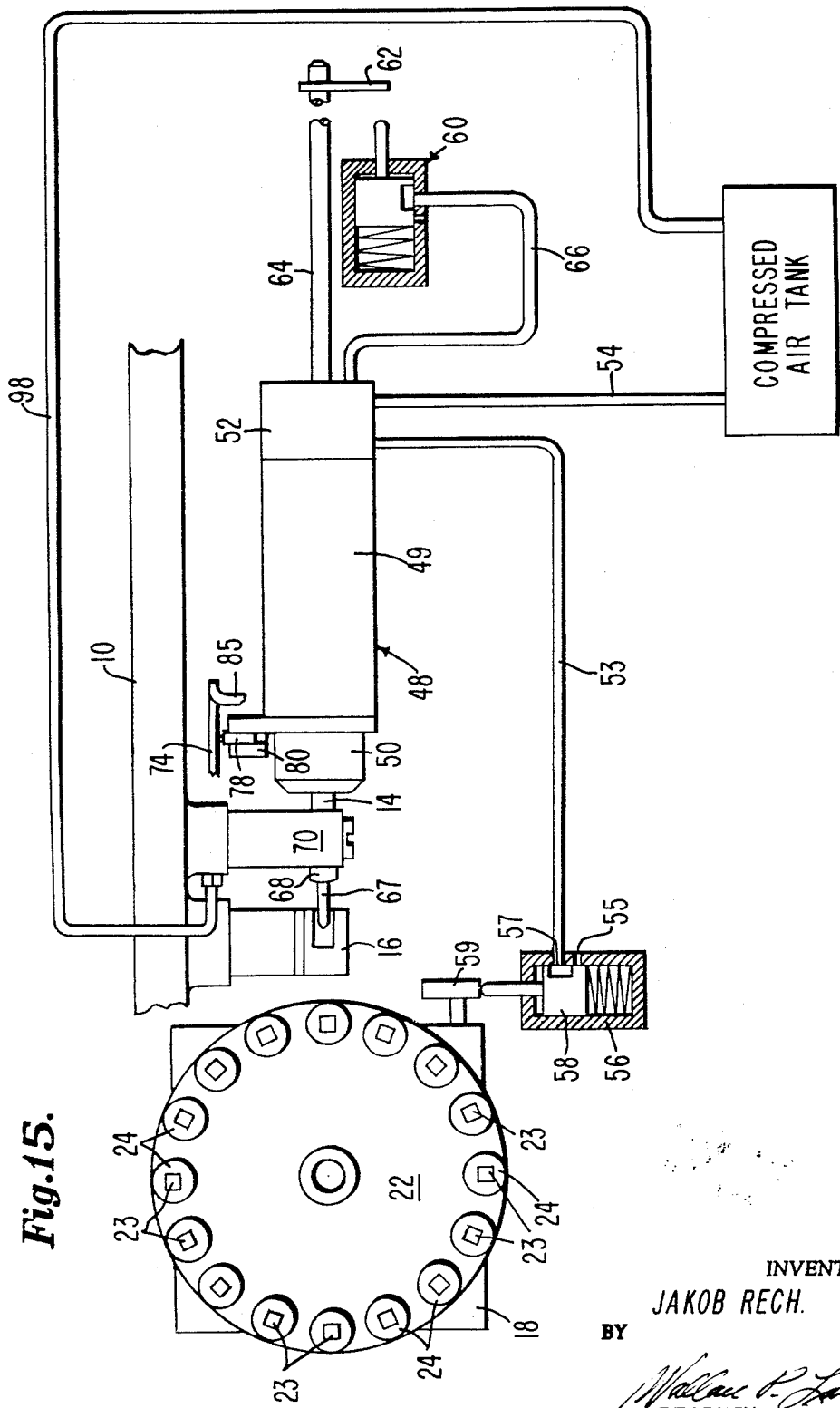

3,438,411
SET SCREW FEEDING AND HANDLING APPARATUS
Jakob Rech, Detroit, Mich., assignor to Burroughs Corporation, Detroit, Mich., a corporation of Michigan
Filed Dec. 13, 1966, Ser. No. 601,368
Int. Cl. B23p *19/06*
U.S. Cl. 144—32                      8 Claims

ABSTRACT OF THE DISCLOSURE

The disclosure embodies an apparatus having a dispenser to dispense set screws singly and having handling mechanism to position a set screw for insertion in a part by a rotatable and movable power driven screw driver.

SUMMARY OF THE INVENTION

The invention resides in the provision of a pivotal set screw handling member which pivots between a set screw dispenser and a guide member to transfer a set screw to the latter by retraction movement of the screw driver, and in the provision of means to discharge the set screw to one end of the guide member in response to a control member actuated by rotation of the screw driver.

The principal object of the invention is to provide an improved set screw handling apparatus for feeding and presenting set screws successively to a set screw insertion tool.

Another object of the invention is to provide an improved set screw handling apparatus which is operated and controlled by operation of a set screw insertion tool.

A specific object of the invention is to provide a set screw feed and handling apparatus in which a set screw transfer member is pivotal between a set screw dispenser and a set screw guideway and is operated by movement of a set screw insertion tool moving between effective and ineffective positions.

Another object of the invention is to provide an improved set screw handling apparatus of the above mentioned character in which air under control of a valve is employed to position a set screw with the valve operated by operation of the tool.

Other objects of the invention will become apparent from the following description, taken in connection with the accompanying drawings in which:

FIG. 5 is a view similar to FIG. 1 showing the operating parts in the positions they assume in the insertion of a set screw;

FIG. 6 is an enlarged fragmentary elevational view, partly in section of details of FIG. 5;

FIG. 7 is a vertical sectional view, taken along the line 7—7 of FIG. 6;

FIG. 8 is another vertical sectional view, taken along the line 8—8 of FIG. 6;

FIG. 9 is a horizontal sectional view partly in elevation, taken along the line 9—9 of FIG. 1;

FIG. 10 is a vertical sectional view, taken along the line 10—10 of FIG. 9;

FIG. 11 is a vertical sectional view, taken along the line 11—11 of FIG. 10 showing a valve in one of two positions;

FIG. 12 is a view similar to FIG. 11 showing the valve in the other of the positions;

FIG. 13 is an enlarged vertical sectional view, taken along the line 13—13 of FIG. 9;

FIG. 14 is a cross-sectional view, taken along the line 14—14 of FIG. 13, and

FIG. 15 is a digarammatic illustration of the apparatus and control system therefor.

Figure 1:
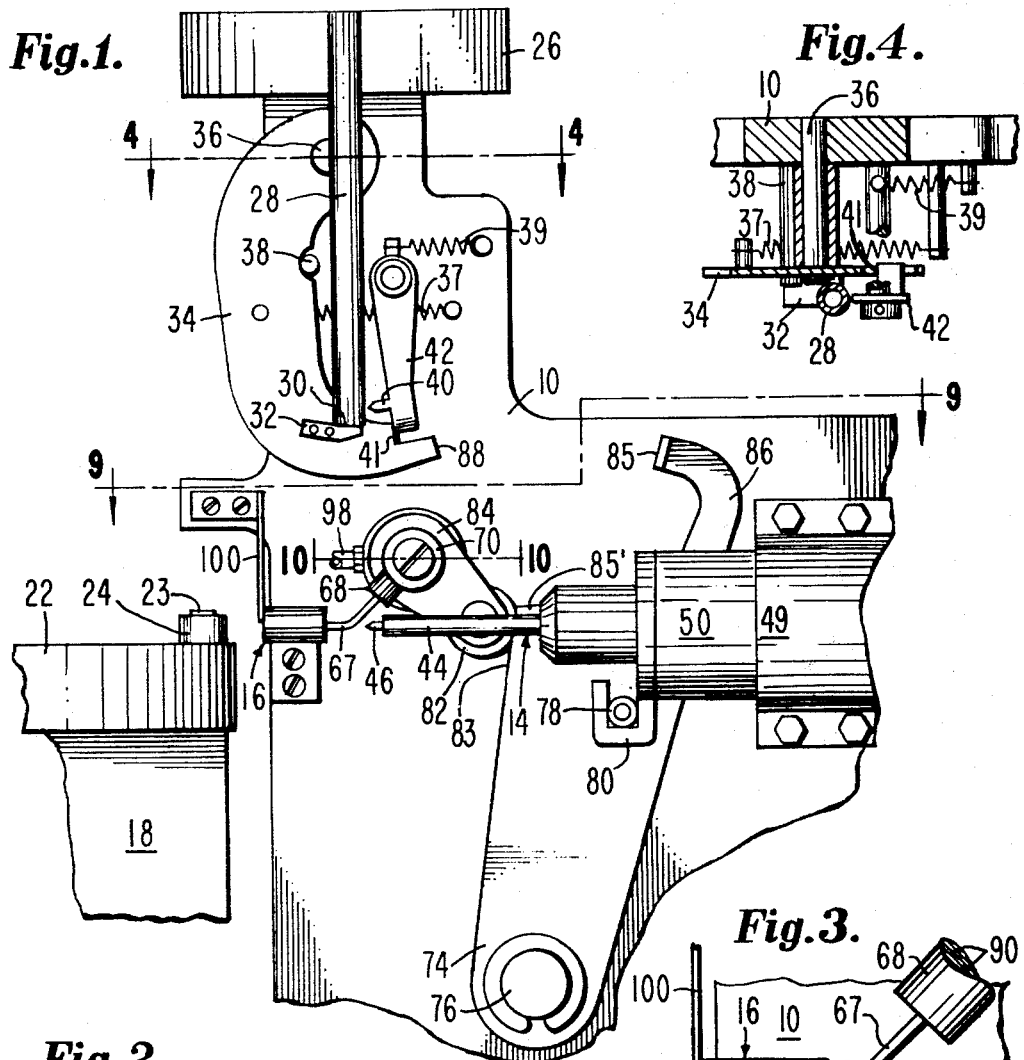
FIG. 1 is a fragmentary side elevational view partly broken away and in section of a set screw handling and inserting apparatus embodying features of the invention.
Figure 4:
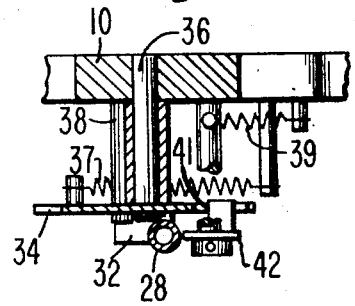
FIG. 4 is an enlarged fragmentary view taken along the line 4—4 of FIG. 1.

In the drawings, the set screw handling apparatus comprises, in general, a supporting member 10, a set screw dispenser 12, a power driven screw driver 14, and a set screw guide member 16. The dispenser 12, screw driver 14 and the guide member 16 may all be mounted on the supporting member 10, the screw driver 14 and the guide member 16 being horizontally aligned, and the dispenser 12 being above the screw driver 14 and the guide member 16.

Adjacent the guide member 16 there is a parts indexing apparatus having a base 18 on which is mounted a rotatable table 22 carrying a plurality of upright fixture pins 23 to hold parts, such as collars 24, in which set screws 25 are to be inserted. The pins 24 are equally angularly spaced apart and hold the collars with their set screw receiving apertures facing outwardly for presentation to the adjacent end of the guide member 16. Any suitable well known pawl and ratchet may be employed to rotate the table 22 so as to present the collars 24 successively to and in alignment with the guide member 16.

Figure 2:
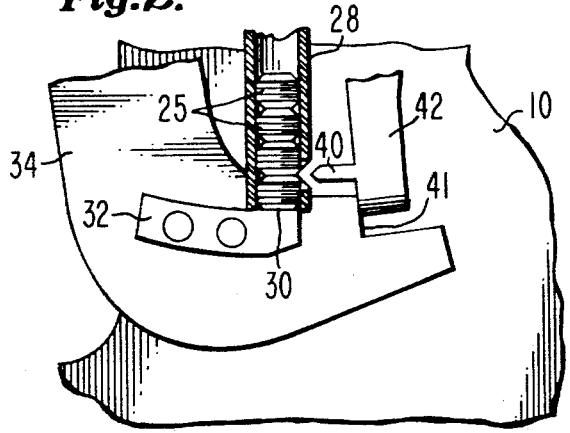
FIG. 2 is an enlarged fragmentary side view, partly in section of certain details of FIG. 1.

The set screw dispenser 12 includes a hopper 26 from which set screws feed downwardly within a tube 28 having a lower open end or outlet 30. A retractable dispenser member 32 normally overlies and closes the outlet 30 and is carried by a lever 34 which is pivoted at its upper end, as at 36, to the supporting member 10. A spring 37 biases the lever 34 in a counterclockwise direction as viewed in FIG. 1 to position the dispenser member 32 over the set screw outlet 30, the lever being limited by a stop pin 38. It will be apparent that when the lever 34 is pivoted clockwise as seen in FIG. 1, the dispenser member 32 will be removed from the outlet 30, as shown in FIG. 5, and the lowermost one of the stack of set screws 25 will drop down. When this occurs, a stop member 40 on the lower end of a lever 42 moves into the tube 28 by a spring 39, under the next set screw to restrain downward movement of the stack so as to effect the dispensing of set screws singly. On return of lever 34 to its normal position, closing the outlet 30, a shoulder 41 on the lever 34 engages and retracts the stop member 40 to the position shown in FIGS. 1 and 2 whereupon the stack of set screws moves down until the lowermost screw rests on the dispenser member 32.

In alignment with the guide member 16 is a shank 44 of the screw driver 14, the shank having a reduced end portion or tip 46 which is adapted to fit freely within a tubular set screw. The tip 46 is provided with splines 47 to mesh with similar internal splines of the set screw 25, as illustrated in FIGS. 7 and 8. Any suitable well-known power element may be used to drive the screw driver 14, such as the well-known pneumatic power element, designated generally by the numeral 48. Since such power elements are well known in the art, a detail disclosure thereof is deemed to be unnecessary. In general, the power element 48 includes an air cylinder 49, a piston 50, and a valve mechanism designated in general by the numeral 52. The valve mechanism 52 is mounted on the rear end of the cylinder 49, as illustrated in FIG. 15, and has an air inlet port (not shown) connected by a tube 54 to a source of compressed air. As is well known, the valve mechanism 52 diverts compressed air from one end of the piston to the other to effect movement of the screw driver in one direction to insert a screw and then in the opposite direction to retract the screw driver. A vent valve 56 has a port 57 which is in communication with the valve mechanism 52 by a tube 53 and has an outlet 55 which is normally closed by a piston type valve member 58 to prevent operation of the piston 50. The vent valve 55 is opened in the present system by a cam 59 which operates by and upon an indexing operation of the table 22. Controlling return of the piston 50 is an air valve 60 which is actuated by an abutment 62 on a rod 64 carried by the piston 50, the valve 60 being connected by a tube 66 to the valve mechanism 52. The screw driver 14 is carried by the external end of the piston 50 and is connected thereto by a conventional connection which allows rotation of the screw driver as the piston 50 is advanced.

In accordance with the invention, a parts carrier or pin 67 is provided to transfer a set screw 25 from the dispenser outlet 30 to the guide member 16. The pin 67 has an end portion thereof press fitted into one end of a larger diameter fitting 68 coaxially thereof, and the fitting 68 is in turn press fitted into a transverse bore of a shaft 70 which is rotatably mounted on the supporting member 10. In its other end, the fitting 68 is provided with a socket 72 to receive a set screw, as is shown more clearly in FIG. 13.

Figure 3:
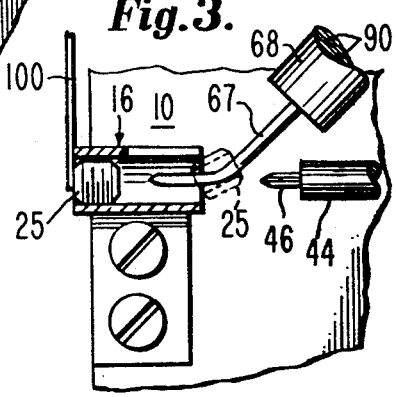
FIG. 3 is another enlarged fragmentary side view of certain other details of FIG. 1.

The set screw carrier or pin 67 is pivotal between a position in which it is in coaxial alignment with the dispenser outlet 30, as shown in FIG. 5, to a position where the pin is within and coaxial with the longitudinal axis of the set screw guide member 16, as shown in FIGS. 1 and 3. The pin 67 is pivoted into alignment with the guide member 16 by the outward movement of the screw driver 14 by interconnecting mechanism including a lever 74 having a lower end pivoted, as at 76, to the supporting member 10. Mounted on one side of the lever 74, there is a roller 78 engaged in a socket 80 on the outer end of the piston 50 such that when the piston 48 moves outwardly, the lever 74 is pivoted counterclockwise, as seen in FIGS. 1 and 5. Engaging the lever 74 is a follower or roller 82 on the free end of a lever 84 which is affixed onto the shaft 70. Thus, when the lever 74 is rotated counterclockwise by outward movement of the piston 50, the lever 84 is pivoted clockwise to rotate the pin 67 from the guide member 16 to the dispenser outlet 30. During this operation, a lateral projection 85 of an upper arm 86 of lever 74 engages a lower end 88 of lever 34 and pivots the latter to release the lowermost set screw in the tube 28 which set screw then descends onto the pin 67. As shown in FIG. 9, a torsion spring 87 is provided to rotate the pin 67 to the dispenser outlet 30 when the piston 50 retracts. One end of the spring 87 abuts a lever arm 89 which is affixed to the shaft 70 and the other end of the spring is anchored to the supporting member 10. The spring 87 also urges the roller 82 against an upright edge 83 of the lever 74, as seen in FIG. 1, and just above its contact point with the roller, the lever edge 83 extends away from the roller, as at 85'. This provides a lost-motion connection between the levers 74 and 84 as the roller rides onto the lever edge 85'. This connection assures the alignment of the pin 67 with the dispenser outlet 30, as shown in FIG. 5, and permits continued advancing movement of the screw driver in the operation of inserting a screw into a collar 24.

In communication with the socket 72 in the end of the fitting 68, there is a plurality of air outlet ports 90 which communicate through air passages 92 and 94 with a port 96 in the shaft 70, the port 96 being in communication with the source of compressed air by means of a tube 98. The port 96 is controlled by rotation of the shaft 70 which in one position, as shown in FIG. 11, aligns the port 96 with the passage 96 in communication with the source of compressed air, the shaft 70 thus functioning as a valve member. This occurs when the pin 66 has been pivoted to the position shown in FIG. 1 within the guide member 16. Consequently, on movement of the pin 66 to the position of FIG. 1, the shaft or valve member 70 establishes communication with the compressed air source, and air jets issuing from the ports 90 blow and strip the set screw from the pin 66 and move the set screw to the opposite end of the guide member 66 where the screw is stopped by a yieldable resilient stop member 100 in the form of a spring blade.

OPERATION

The operating parts of the apparatus are at rest in FIG. 1 in the positions they assume following the insertion of a set screw 25 in the collar 24 at the insertion station. When the parts are in the positions shown, a set screw carried by the pin 66 has been stripped from the pin by air jets issuing from the ports 90 and has been moved along the guide member 16 to a position against the yieldable stop member 100. When the table 22 is indexed to move the next collar to the insertion station, the vent valve member 58, shown in FIG. 15, is activated by the cam 58 and moves to open momentarily its port 55 to atmosphere. This activates the piston 50 which moves outwardly and pivots levers 74 and 84 to pivot the pin 67 clockwise, as seen in FIGS. 1 and 5. As the pin 67 moves clockwise, the screw driver 14 moves forwardly and enters the guide member 16 and picks up the screw and inserts and threads the screw into the collar. Also, the forward movement of the screw driver 14 acting through the upper end 86 of the lever 74 pivots the dispenser lever 34 clockwise, as seen in FIG. 1, to release the lowermost one of the stacked set screws in the dispenser tube 28. The set screw drops down over the pin 67 and slides down into the socket 72. The screw driver 14 may still be screw threading the set screw into a collar 20, but the pin 67 will not be moved beyond the aligned position with the tube outlet 30 because of the lost-motion connection between the lever 74 and the roller 82 as the roller rides onto the lever edge portion or dwell 85'. When the set screw has been screw threaded into the collar the desired predetermined distance, the air valve 60 is actuated by the abutment 62 on the piston rod 64 to direct air to the other end of the piston whereby the piston 50 is retracted until it engages the rear end of its cylinder. During retraction of the piston 50 and, therefore, the screw driver 14, the torsion spring 87 is free to rotate the pin 67 counterclockwise until the pin is within the guide member 16, as shown in FIG. 1. As this position of the pin is approached, the set screw slides partway down the pin to the bend in the pin and as the pin approaches alignment coaxially with the guide member, the port 96 is opened. This establishes communication between the outlet port 90 and the source of compressed air, and the resultant air jets strip the set screw from the pin 67 and deposit the set screw against the yieldable stop member 100 as previously mentioned.

What is claimed is:
1. An apparatus for handling a tubular set screw and positioning the screw for insertion in a member having a threaded set screw receiving aperture comprising a guideway member positioned to receive and align the screw with the aperture in the member, a pin pivotally mounted at one end thereof and having a free end to receive a tubular set screw, said pin pivotal from a set screw receiving position to a position aligned with said guide member, means operable to move the screw along said pin into said guideway member, and a power operated tool movable through said guideway member into engagement with the screw.

2. An apparatus for handling a tubular set screw and positioning the screw for insertion in a member as defined by claim 1 wherein said means comprises pressurized air directed along said pin.

3. An apparatus for handling a tubular set screw and positioning the screw for insertion in a member as defined by claim 1 wherein movement of said power operated tool to entry into said guideway member retracts said pin to said set screw receiving position.

4. An apparatus for handling a tubular set screw and positioning the screw for insertion in a member having a threaded set screw receiving aperture comprising a set screw guideway member positioned to guide a set screw to the aperture, a set screw dispenser member normally restraining feed of a set screw from a downwardly facing outlet above said guideway and operable to release a set screw, a pin pivotally mounted at one end thereof and having a free end to receive a screw, said pin pivotal from a screw receiving position in alignment with said outlet to a position within said guideway member, means operable to move a set screw off of said pin along said guideway toward the member, and a power driven screw driver movable through said guideway to engage the screw and operatively connected to said pin to pivot the latter to the screw receiving position prior to entering said guideway.

5. An apparatus for handling a tubular set screw and positioning the screw for insertion in a member having a threaded set screw receiving aperture as defined by claim 4 wherein said tool is operatively connected to operate said set screw dispenser member to release a screw on return of said pin to alignment with said outlet.

6. An apparatus for handling a tubular set screw and positioning the screw in alignment with a threaded aperture in a member, comprising a guideway along which a screw is movable toward the member, a set screw magazine having an outlet for a screw movable along a line transverse to the direction of movement of a screw along said guideway, or set screw carrier pin pivoted at one end thereof between said outlet and said guideway, said pin having a free end to receive a screw from said outlet and pivotal to a position within said guideway, a linearly movable tool operatively connected to said pin to retract the latter from said guideway and positioned to enter said guideway to engage a set screw, air outlets positioned to direct air along said pin in a direction to blow a set screw off of the pin along said guideway and in communication with a source of pressurized air, and a rotary valve member controlling said air outlets and operated by the pivotal action of said pin.

7. An apparatus for handling a tubular set screw and positioning the screw in alignment with a threaded aperture in a member as defined by claim 6 wherein said valve member opens said air outlets by and upon movement of said pin into alignment with said guideway.

8. An apparatus for handling a tubular set screw and positioning the screw for insertion in a member having a threaded aperture, a horizontally positioned tubular guide member having one end for alignment with the aperture and having a set screw inlet in the top and at the other end thereof, a set screw dispenser having a downwardly directed outlet, a set screw carrier pin pivoted at one end thereof, said pin pivotal from a set screw receiving position in alignment with said outlet through said inlet into coaxial relationship with said tubular guide member, air outlets positioned to direct air streams along said pin to strip a set screw therefrom and move the set screw along said guide member toward said one end thereof, a yieldable restraining member overlying said one end of said guide member, a linearly movable screw-inserting tool coaxially aligned with said guide member and operable to move through said guide member, said tool operatively connected to said pin to move the latter into said guide member, and a rotary valve member operated by said tool to open said outlets upon movement of said pin into coaxial alignment with said guide member.

References Cited

UNITED STATES PATENTS

| | | | |
|---|---|---|---|
| 2,689,589 | 9/1954 | Allen et al. | 144—32 |
| 2,803,377 | 8/1957 | Wilson. | |
| 2,806,494 | 9/1957 | Kull | 144—32 |
| 2,904,084 | 9/1959 | Kruk | 144—32 |

DONALD R. SCHRAN, *Primary Examiner.*